(12) United States Patent
Burns et al.

(10) Patent No.: US 12,090,828 B2
(45) Date of Patent: Sep. 17, 2024

(54) TONNEAU COVER SYSTEM

(71) Applicants: Teresa L. Burns, Rigby, ID (US); Brian G. Burns, Rigby, ID (US)

(72) Inventors: Teresa L. Burns, Rigby, ID (US); Brian G. Burns, Rigby, ID (US)

( * ) Notice: Subject to any disclaimer, the term of this patent is extended or adjusted under 35 U.S.C. 154(b) by 190 days.

(21) Appl. No.: 17/956,572

(22) Filed: Sep. 29, 2022

(65) Prior Publication Data
US 2023/0150348 A1 May 18, 2023

Related U.S. Application Data

(60) Provisional application No. 63/280,256, filed on Nov. 17, 2021.

(51) Int. Cl.
*B60J 7/14* (2006.01)
*B60J 7/16* (2006.01)

(52) U.S. Cl.
CPC .............. *B60J 7/141* (2013.01); *B60J 7/1607* (2013.01)

(58) Field of Classification Search
CPC ....... B60J 7/14; B60J 7/141; B60J 7/16; B60J 7/1607; B60P 7/04; B62D 53/08
USPC .......................... 296/100.02, 100.04, 100.11
See application file for complete search history.

(56) References Cited

U.S. PATENT DOCUMENTS

| | | | | |
|---|---|---|---|---|
| 3,574,363 A | * | 4/1971 | Stephenson | F16C 11/069 280/901 |
| 4,216,990 A | * | 8/1980 | Musgrove | B60J 7/041 296/213 |
| 4,685,695 A | * | 8/1987 | LeVee | B62D 53/0828 296/37.6 |
| 4,832,359 A | * | 5/1989 | Rafi-Zadeh | B62D 53/0828 296/176 |
| 5,056,856 A | * | 10/1991 | Pederson | B62D 53/0828 296/100.06 |
| 5,303,947 A | * | 4/1994 | Gerber | B62D 53/0828 296/57.1 |
| 5,851,047 A | | 12/1998 | Adams et al. | |
| 5,934,736 A | * | 8/1999 | Luke | B60J 7/08 280/507 |
| 5,964,495 A | * | 10/1999 | Blanton | B62D 63/04 280/901 |
| 6,439,639 B1 | * | 8/2002 | Branting | B60J 7/141 296/100.09 |

\* cited by examiner

*Primary Examiner* — Jason S Daniels

(57) ABSTRACT

A tonneau cover includes a sheet of material. The sheet of material may have a first section and a second section, with a hitch aperture to receive a pin box of a fifth wheel trailer. The hitch receiver may be located under the hitch aperture when the tonneau cover is positioned on the truck. The first and second sections may couple to the truck bed via a first and second bracket. After the first and second sections are in position, a trailer may be attached to the truck while the truck bed is covered.

16 Claims, 11 Drawing Sheets

TONNEAU COVER SYSTEM

CROSS-REFERENCE TO RELATED APPLICATIONS

This application claims the benefit of U.S. Provisional Application Ser. No. 63/280,256, filed on Nov. 17, 2021, which is incorporated herein by reference.

TECHNICAL FIELD

The present disclosure relates to a tonneau cover. More particularly, the present disclosure relates to a tonneau cover adapted to receive a fifth wheel camper trailer or other trailers.

BACKGROUND

Tonneau covers have been used for years to enhance the aerodynamics of a truck, leading to better gas mileage, protect cargo and the truck bed from the weather elements, and to protect cargo from theft. These covers come in a variety of configurations. For example, tonneau covers may be made from the following materials: vinyl, fiberglass, canvas, plastic, or aluminum. In addition, tonneau covers come in a variety of lengths and widths to fit many different types of trucks. Tonneau covers open and provide access to a bed of a truck in different ways. Some roll up towards the cab of the truck while others may have panels that fold towards the cab of the truck to allow access to the bed of the truck.

Even with all of the benefits and configurations of tonneau covers, they still have shortcomings when it comes to using, for example, fifth wheel camper trailers and goose neck animal trailers. Tonneau covers on the market cover the entire bed of a truck. Consequently, to connect a fifth wheel camper trailer or other types of trailers to the hitch in the bed of the truck, the tonneau cover needs to be rolled to the cab or removed. With that being said, when a user desires to use the truck bed after the camper trailer is attached, any cargo in the bed of the truck will be exposed to theft and weather, and may potentially blow out of the truck.

Accordingly, there is a need for a tonneau cover that allows a fifth wheel or goose neck trailer to be attached to a truck while covering the truck bed to protect cargo from being stolen and covering it from the weather elements. The present invention seeks to solve these and other problems.

SUMMARY OF EXAMPLE EMBODIMENTS

In one embodiment, a tonneau cover system includes a sheet of material. The sheet of material may comprise a front portion, a rear or tailgate portion, and a hitch aperture interposed therebetween so as to receive a pin box of a fifth wheel trailer or a receiver of a goose neck trailer. In some embodiments, the sheet of material may be manufactured from a soft, hard, or mix of soft and hard material. The front portion may be coupled to the bed rail proximate a cab of the truck via a front fastener. The tailgate portion may comprise a first section and a second section, both of which may be coupled to each other via a section fastener. In particular, the second section may comprise a flap that when coupled to the first section is adjacent the hitch aperture. When the flap is detached from the first section, a slit or channel is created that leads to the hitch aperture. The hitch receiver may be located under the hitch aperture when the cover is coupled to the truck.

A first support bar, a second support bar, a third support bar, and a fourth support bar may be removably attachable to a lower surface of the sheet of material. The first, second, third, and fourth support bars may extend from a first side to a second side of the cover. The first, second, third, and fourth support bars may couple to bed rails on the truck. In some embodiments, the second, third, and fourth support bars may each comprise a first bar section, a second bar section, and a third bar section removably attachable to each other. The second, third, and fourth support bars may be removably attachable to allow the flap to be detached so as to open the channel and allow the fifth wheel trailer to be coupled to the truck.

To protect the hitch aperture and to prevent weather elements, such as snow and rain, from entering the truck bed, the cover may further comprise a boot that is separate from the sheet of material. A bottom portion (e.g., a bottom seam) of the boot may comprise a weighted bottom. The weighted bottom allows the boot to be wind resistant and maintain its shape. The weighted bottom comes into contact with and sits on an upper surface of the sheet of material. Specifically, the weighted bottom may surround the hitch aperture and prevent water and/or debris from entering the bed through the hitch aperture.

In one embodiment, a method of using a cover comprises securing a sheet of material and support bars to the bed rails of the truck; detaching a flap from a first section of the sheet of material; detaching each first section, second section, and third section of a second support bar, third support bar, and fourth support bar; creating a channel that leads to a hitch aperture; placing a boot over a pin box of a fifth wheel camper trailer; securing the boot to the hitch; coupling the pin box of the fifth wheel camper trailer to the hitch receiver in a truck; and reattaching the second, third, and fourth supports bars together; and reattaching the flap to the first section of the sheet of material.

In one embodiment, a tonneau cover system may comprise a sheet of material. The cover may comprise an aperture therethrough so as to receive a pin box of a fifth wheel, goose neck trailer, or any other similar trailer, thereby allowing the bed of the truck to be covered and thus, the items therein are protected from the elements and theft. The aperture may be trapezoidal shaped. The aperture may be circumscribed by a fastener. A lid cover may be removably attachable to an upper surface of the sheet of material. In particular, the lid cover may be removably attachable to the fastener.

In one embodiment, a tonneau cover system may comprise a sheet of material. The sheet of material may cover the entire bed of a truck. The cover may be manufactured from a soft, hard, or mix of soft and hard material. The sheet of material may comprise a front portion, a rear or tailgate portion, and a hitch aperture interposed thereinbetween so as to receive a pin box of a fifth wheel trailer or any other type of trailer coupleable to a hitch receiver (e.g., trailer hitch ball or of fifth wheel receiver) in a bed of a truck. The front portion may be coupled to the bed rail proximate a cab of the truck via a front fastener. The tailgate portion may comprise a first section and a second section, both of which may be coupled to each other via a section fastener. In between the first and second sections, a channel may be created that leads to the hitch aperture. A lid cover may be removably attachable to an upper surface of the sheet of material. In particular, the lid cover may be removably attachable to the fastener.

In one embodiment, a tonneau cover system may comprise a sheet of material. The sheet of material may be manufactured out of a rigid material. The sheet of material may comprise a first section and a second section, with each being removably attachable from each other. A hitch aperture may be created between a first recessed portion on the first section and a second recessed portion on the second section. The first and second sections may slide into the bed of the truck via a first bracket and a second bracket. The first and second sections may be secured to each other via a third bracket. Further, a fourth bracket may be coupled to a third side of the truck. A fifth bracket may be coupled to a fourth side of the truck. The fourth and fifth brackets may support the first and second sections, respectively.

DETAILED DESCRIPTION OF EXAMPLE EMBODIMENTS

Figure 1:
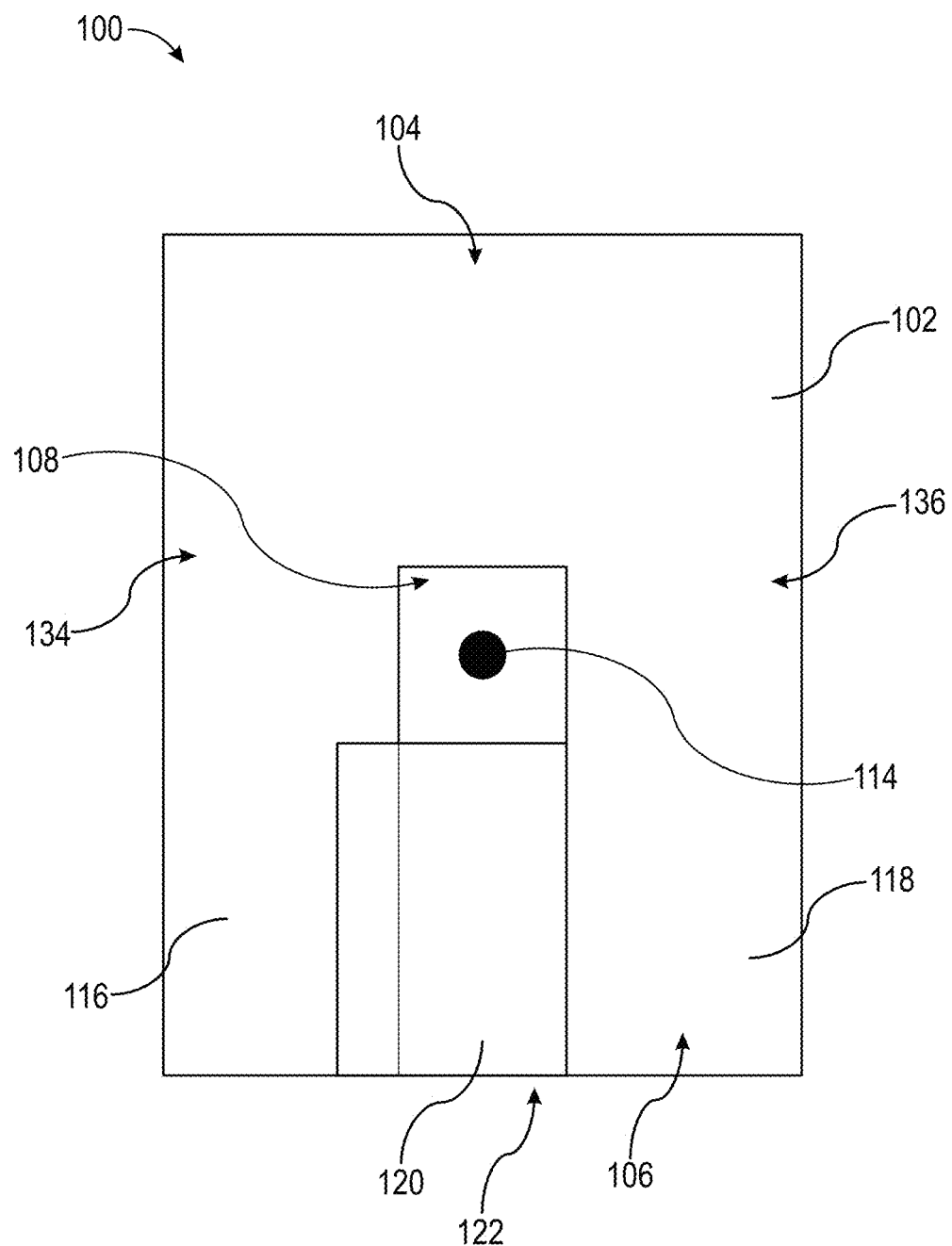
FIG. 1 illustrates a top plan view of a tonneau cover system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a tonneau cover that allows a fifth wheel trailer to be attached to a truck while covering the truck bed to protect cargo from being stolen and protecting it from weather and debris. The present invention seeks to solve these and other problems.

Tonneau covers are extremely useful and may be found on many trucks. These covers allow cargo to be covered and protected from weather and theft. While tonneau covers come in a variety of configurations, most of them cannot be used while using a fifth wheel trailer. Accordingly, the bed of the truck is exposed to weather and is unprotected from theft, which, at times, forces users to place cargo inside of the truck or camper and not utilize the truck bed space. It is not until the fifth wheel camper has been unhitched that the typical truck cover may be unrolled/unfolded to cover the bed of the truck.

A tonneau cover system described herein comprises a sheet of material with a hitch aperture so as to receive a fifth wheel camper. The sheet of material may also comprise a first section and a second section coupleable together via a fastener. Accordingly, when coupling the fifth wheel camper trailer to the truck, the first and second sections may be separated creating a channel that leads to the hitch aperture and creates a path to attach the trailer and truck. It will be appreciated that the tonneau cover may protect cargo while at the same time allowing a fifth wheel trailer to be coupled to the truck.

As shown in FIG. 1, in one embodiment, a tonneau cover system 100 includes a sheet of material 102. The sheet of material 102 may comprise a front portion 104, a rear or tailgate portion 106, and a hitch aperture 108 interposed thereinbetween so as to receive a pin box 110 of a fifth wheel trailer 112 (shown in FIG. 3) or any other type of trailer coupleable to a hitch receiver 114 (e.g., trailer hitch ball or of fifth wheel receiver) in a bed of a truck. In some embodiments, the sheet of material 102 may be manufactured from a soft, hard, or mix of soft and hard material. For example, the sheet of material 102 may be manufactured from vinyl, canvas, aluminum, fiberglass or any other type of material. In some embodiments, the sheet of material 102 may be configured to roll towards the cab of the truck to provide access to the bed of the truck. Alternatively, in some embodiments, the sheet of material 102 may comprise sealed, folding slits (e.g., a living hinge) so as to allow the sheet of material 102 to be folded towards the cab of the truck to provide access to the bed of the truck.

The front portion 104 may be coupled to the bed rail proximate a cab of the truck via a front fastener (e.g., hook and loop, snaps, clamps, or bolts). The tailgate portion 106 may comprise a first section 116 and a second section 118, both of which may be coupled to each other via a section fastener, such as hook and loop, snaps, or magnets. In particular, the second section 118 may comprise a flap 120 that when coupled to the first section 116, is adjacent to the hitch aperture 108. When the flap 120 is detached from the first section 116, a channel 122 is created that leads to the hitch aperture 108. In some embodiments, the flap 120 may be sewn into the second section 118. Alternatively, in some embodiments, the flap 120 may be formed from and be a single unit with the second section 118. It will be appreciated that the cover system 100 is designed to be closed except when attaching the fifth wheel camper 112 to the truck or when unloading or loading cargo. The hitch receiver 114 may be located under the hitch aperture 108 when the cover system 100 is coupled to the truck.

Figure 2:
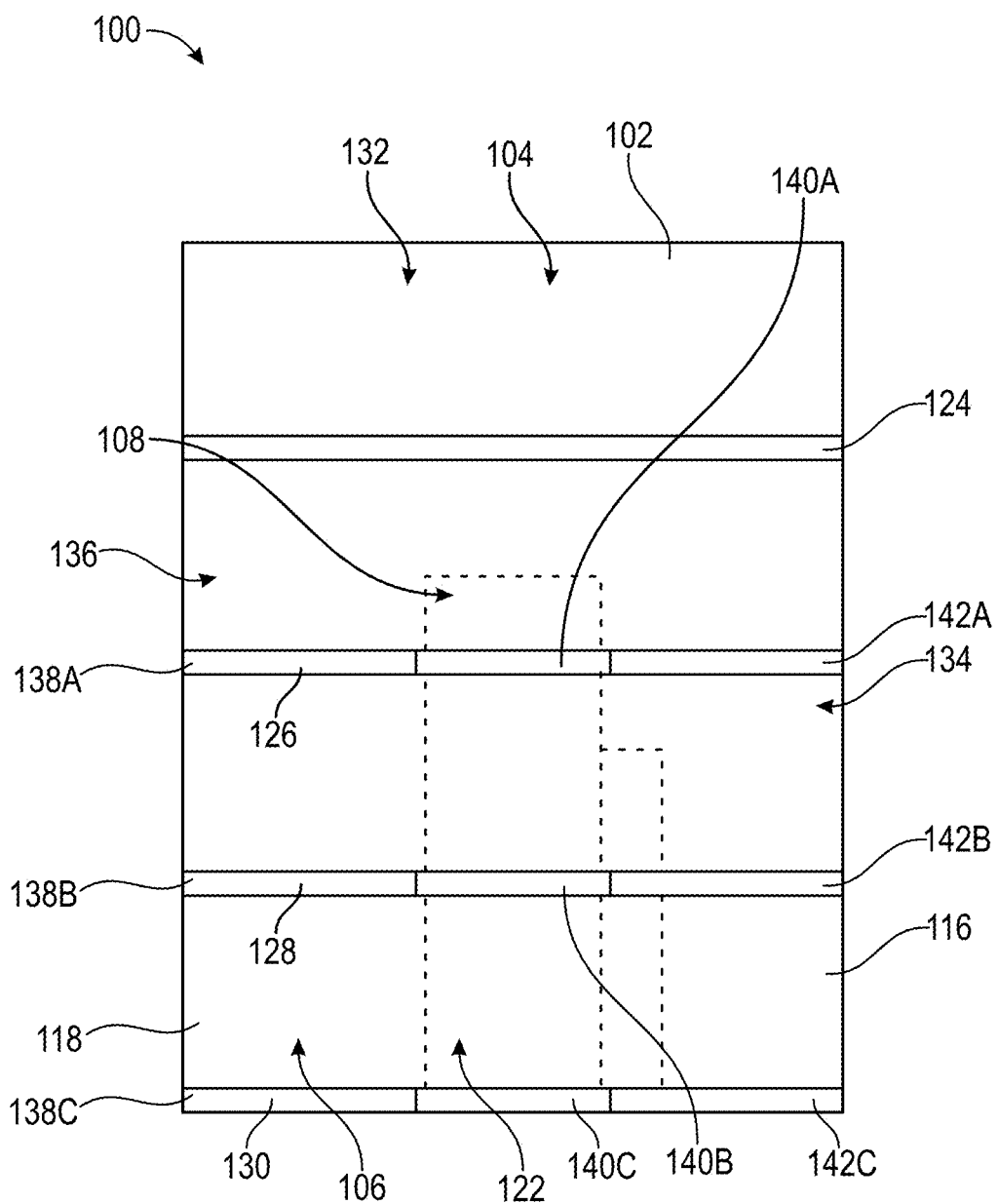
FIG. 2 illustrates a bottom plan view of a tonneau cover system.

As illustrated in FIG. 2, a first support bar 124, a second support bar 126, a third support bar 128, and a fourth support bar 130 may be removably attachable to a lower surface 132 of the sheet of material 102. It will be appreciated that the support bars 124-130 may provide rigidity and structural support for the cover system 100. While four support bars are shown, it will be appreciated that, in some embodiments, the cover system 100 may comprise more than four support bars or less than four support bars. The first, second, third, and fourth support bars 124-130 may extend from a first side 134 to a second side 136 of the sheet of material 102. In some embodiments, the first support bar 124 may be a single unit, without separate, detachable sections. However, in an alternate embodiment, the first support bar 124 may comprise multiple, removably attachable sections. The first support bar 124 may couple to the front of the bed near the cab of the truck.

In some embodiments, the first, second, third, and fourth support bars 124-130 may couple to bed rails on the truck. The second, third, and fourth support bars 126-130 may each comprise a first bar section 138A-138C, a second bar section 140A-140C, and a third bar section 142A-142C removably attachable to each other. For example, the first section 138A, second section 140A, and third section 142A of the second support bar 126 may couple to each other via a ring pin, wire lock, push-button release pin, magnets, or any other type of coupling mechanism. The second, third, and fourth support bars 126-130 may be removably attachable to allow the flap 120 to be detached so as to open the channel 122 and allow the fifth wheel trailer 112 to be coupled to the truck.

Figure 3:
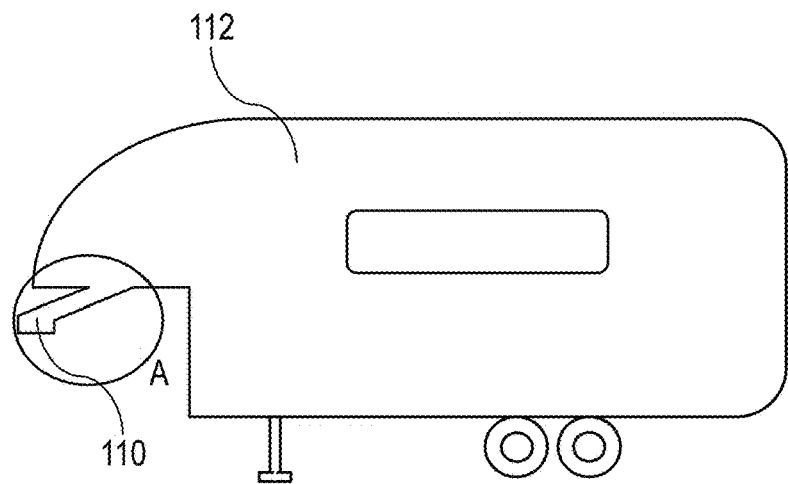
FIG. 3 illustrates a side elevation view of a fifth wheel camper trailer.
Figure 4:
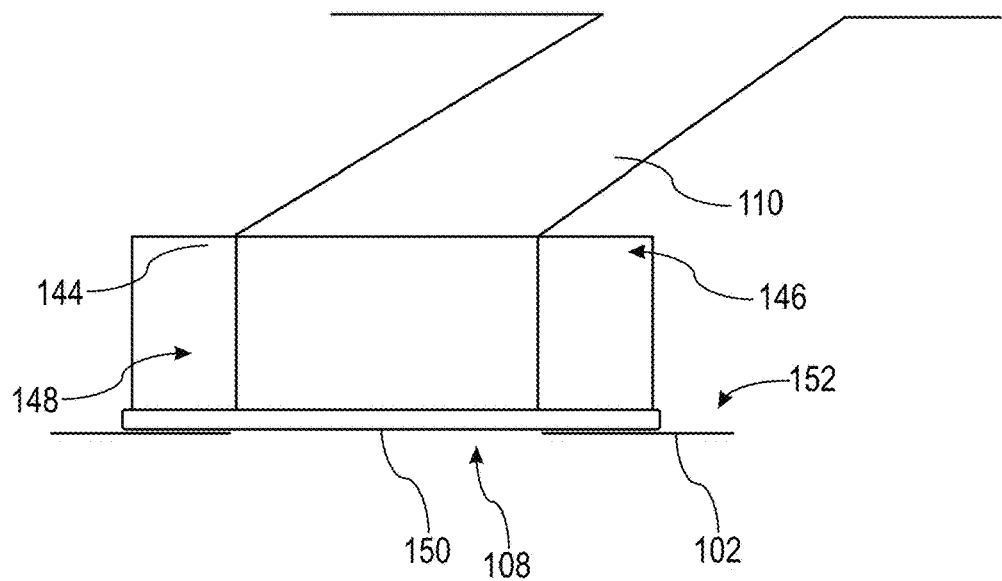
FIG. 4 illustrates a detailed view of circle A of FIG. 3 of a pin box covered by a boot.

As shown in FIGS. 3-4, to protect the hitch aperture 108 and to prevent weather elements, such as snow and rain, from entering the truck bed, the cover 100 may further comprise a boot 144 that is separate from the sheet of material 102. The boot 144 may be manufactured from vinyl, canvas, plastic, Gore-Tex®, or any other weatherproof material or non-weatherproof material. The boot 144 may be cylindrical, rectangular, etc. and a single unit that may be slid or pulled over the pin box 110 of the fifth wheel trailer 112. In some embodiments, the boot 144 may have hook and loop, a zipper, or other fastener, which would allow the boot 144 to wrap around the pin box and be secured to, for example, all sides of the pin box 110. The boot 144 may be secured to the pin box 110, in some embodiments, by using male or female snaps that are attached to the pin box 110 and male or female snaps that are attached to the boot 144. Accordingly, the boot 144 would be secured to the pin box 110. Further, in an alternate embodiment, the boot 144 may comprise a drawstring with a cord lock at a top portion 146.

A bottom portion 148 (e.g., a bottom seam) of the boot 144 may comprise a weighted bottom 150 having sand, different types of metal, or any other weighted material. The weighted bottom 150 allows the boot 144 to be wind resistant and maintain its shape. The weighted bottom 150 comes into contact with and sits on an upper surface 152 of the sheet of material 102. Specifically, the weighted bottom 150 may surround the hitch aperture 108 and prevent water or other debris from entering the bed through the hitch aperture 108. In some embodiments, the weighted bottom 150 may comprise magnets that couple to ferromagnetic metals (e.g., iron, steel, nickel) that circumscribe the hitch aperture 108. Further, in one embodiment, the bottom portion 148 of the boot 144 comprises hook and loop, which may couple to hook and loop on the upper surface 152 of the sheet of material 102. It could be envisioned that the bottom portion 148 of the boot 144 may couple to the upper surface 152 of the sheet of material 102 using snaps, having a boot sewn to the sheet of material 102, or any other fastening mechanism.

In one embodiment, a method of using a cover 100 comprises securing a sheet of material and support bars 124-130 to the bed rails of the truck; detaching a flap 120 from a first section 116 of the sheet of material 102; detaching each first section 138A-138C, second section 140A-140C, and third section 142A-142C of a second support bar 126, third support bar 128, and fourth support bar 130; creating a channel 122 that leads to a hitch aperture 108; placing a boot 144 over a pin box 114 of a fifth wheel camper trailer 112; securing the boot 144 to the pin box 110; coupling the pin box 110 of the fifth wheel camper trailer 112 to the hitch receiver 114 in a truck; and reattaching the second, third, and fourth supports bars 126-130 together; and reattaching the flap 120 to the first section 116 of the sheet of material 102.

Figure 5:
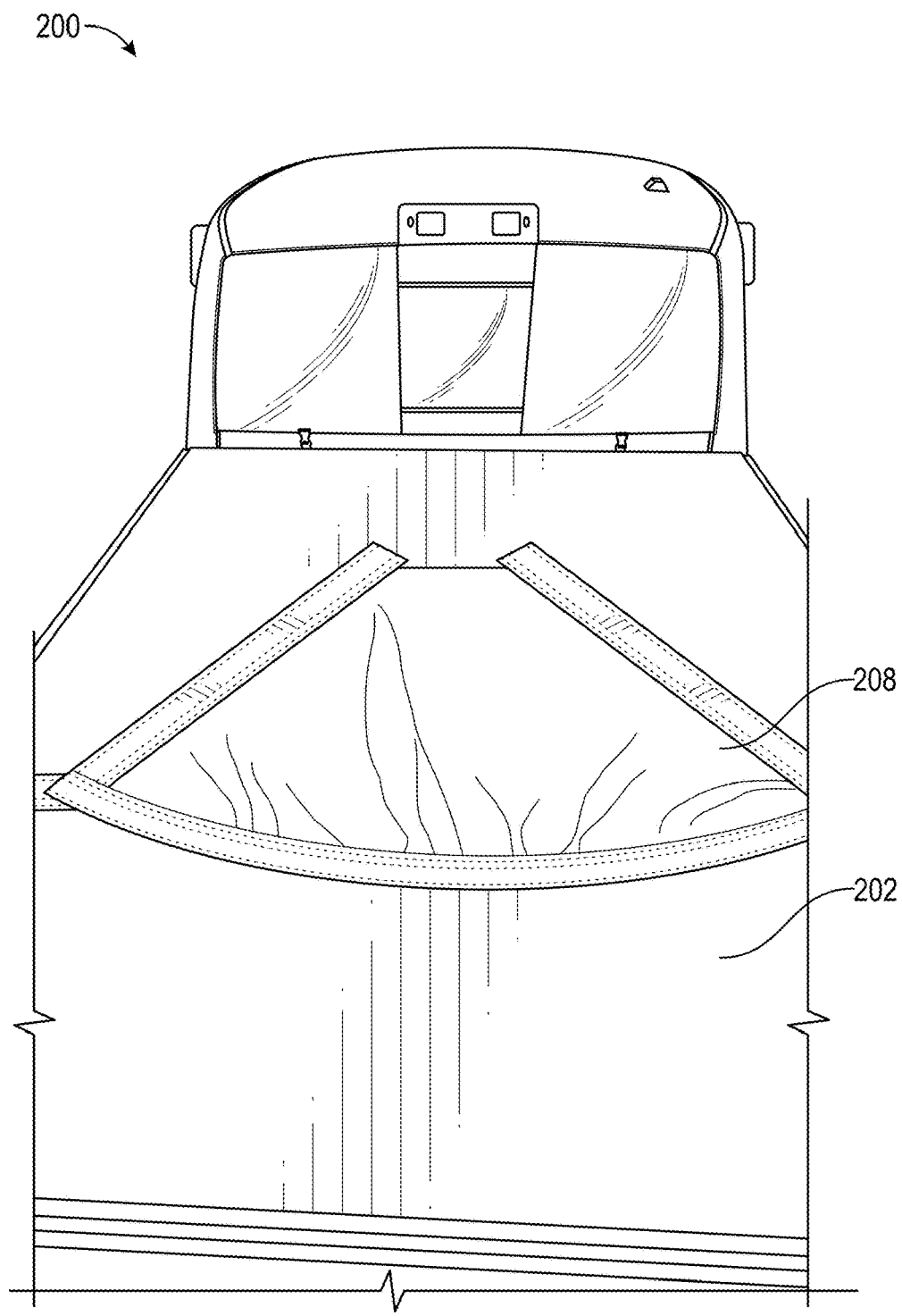
FIG. 5 illustrates a rear perspective view of a tonneau cover system.
Figure 6:
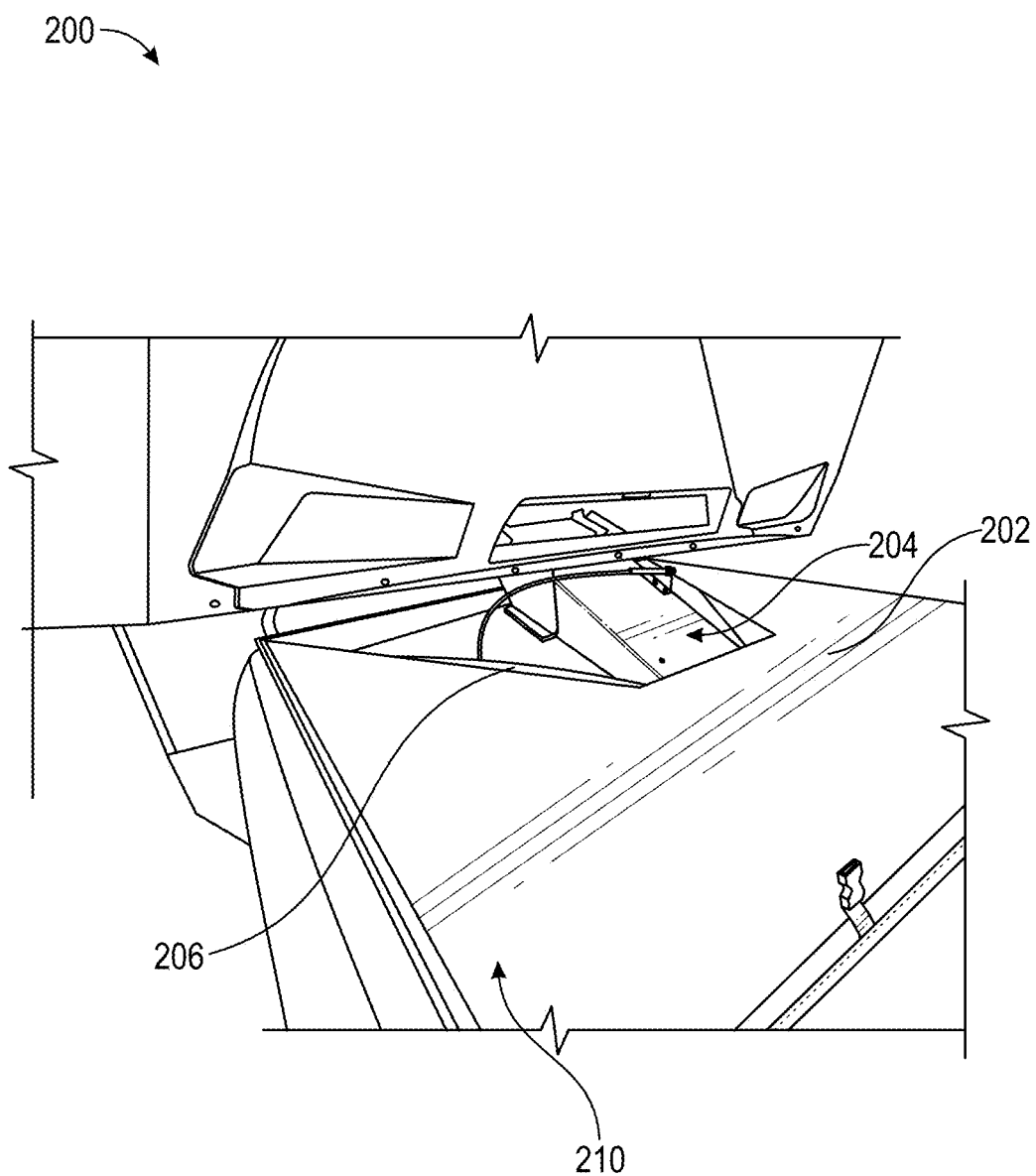
FIG. 6 illustrates a front perspective view of a tonneau cover system.

In one embodiment, as shown in FIGS. 5-6, a tonneau cover system 200 may comprise a sheet of material 202. The sheet of material 202 may cover the entire bed of a truck. The cover 200 may be manufactured from a soft, hard, or mix of soft and hard material. For example, the sheet of material 202 may be manufactured from vinyl, canvas, aluminum, fiberglass or any other type of material. In some embodiments, the sheet of material 202 may be configured to roll towards the cab of the truck to provide access to the bed of the truck. Alternatively, in some embodiments, the sheet of material 202 may comprise sealed, folding slits (e.g., living hinges) so as to allow the sheet 202 to be folded towards the cab of the truck to provide access to the bed of the truck. Furthermore, the cover 200 may comprise a hard material, such as fiberglass, that is coupled to the bed of the truck and lifted via hydraulic arms or other assisting mechanisms.

Further, the cover system 200 may comprise a frame positioned thereunder to add support to the sheet of material 202. The cover may comprise an aperture 204 therethrough so as to receive a pin box of a fifth wheel, a goose neck trailer, or any other similar trailer, thereby allowing the bed of the truck to be covered and thus, the items therein are protected from the elements and theft. The aperture 204 may be shaped like a trapezoid or any other shape, such as ovular, circular, and rectangular. The aperture 204 may, in some embodiments, be circumscribed by stretchable material that may fit tightly around the pin box that would further ensure that debris and water not enter the bed of the truck. The aperture 204 may be circumscribed by a fastener 206. Alternatively, the fastener 206 may circumscribe a portion of the aperture. The fastener 206 may include hook and loop, snaps, buckles, or any other type of fastening mechanism.

To cover the aperture 204, the lid cover 208 may be removably attachable to an upper surface 210 of the cover 200. In particular, the lid cover 208 may be removably attachable to the fastener 206. As such, when a user desires to couple a pin box to the hitch receiver in the truck bed, the lid cover 208 may be removed therefrom to allow access to the truck bed. The lid cover 208 may, in some embodiments, be a flap that comprises a side that is either permanently or non-permanently attached to the cover 200. The lid cover 208 may be manufactured from the same material as the cover 200 or a different material.

Figure 7:
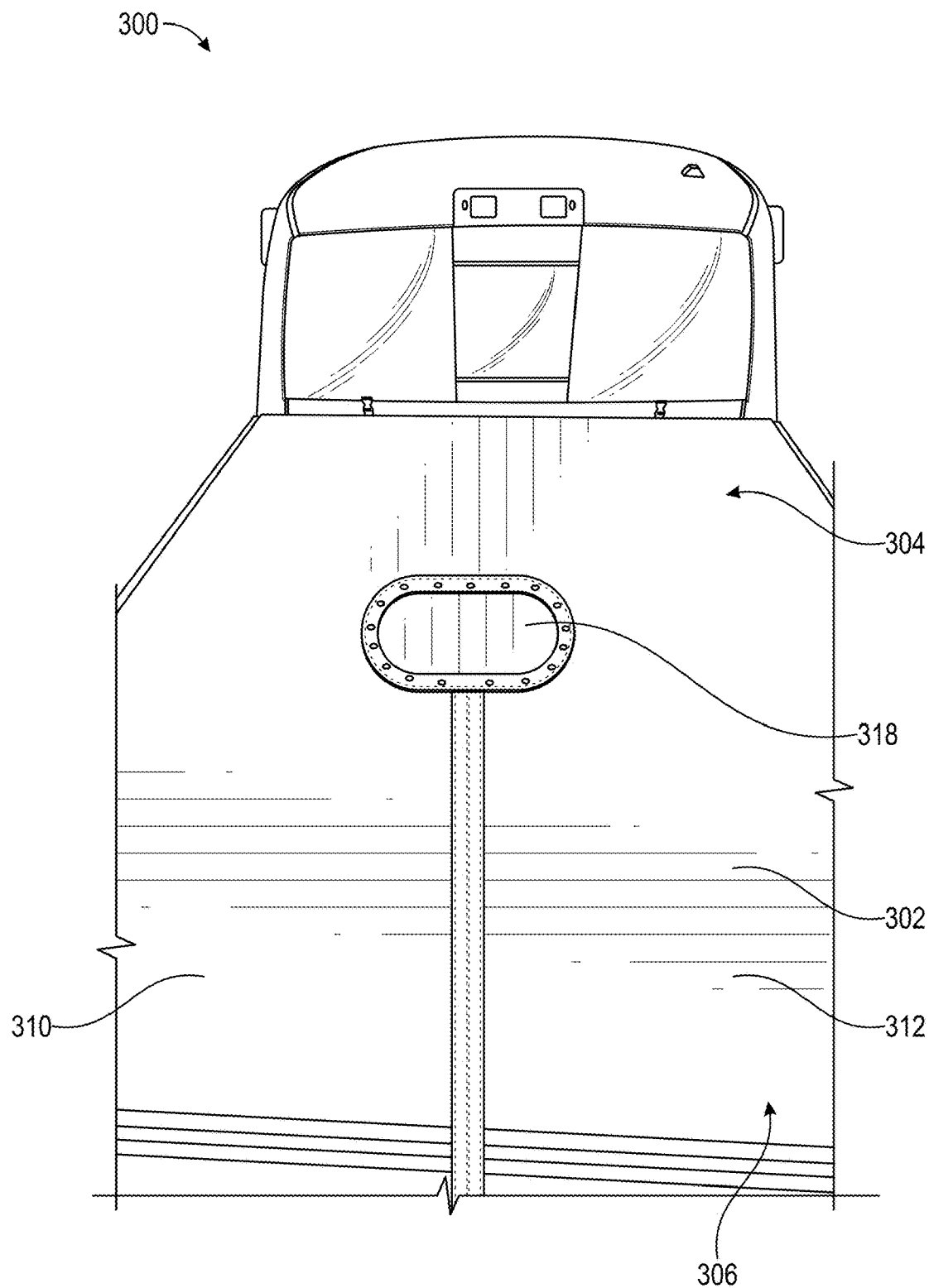
FIG. 7 illustrates a rear perspective view of a tonneau cover system.
Figure 8:
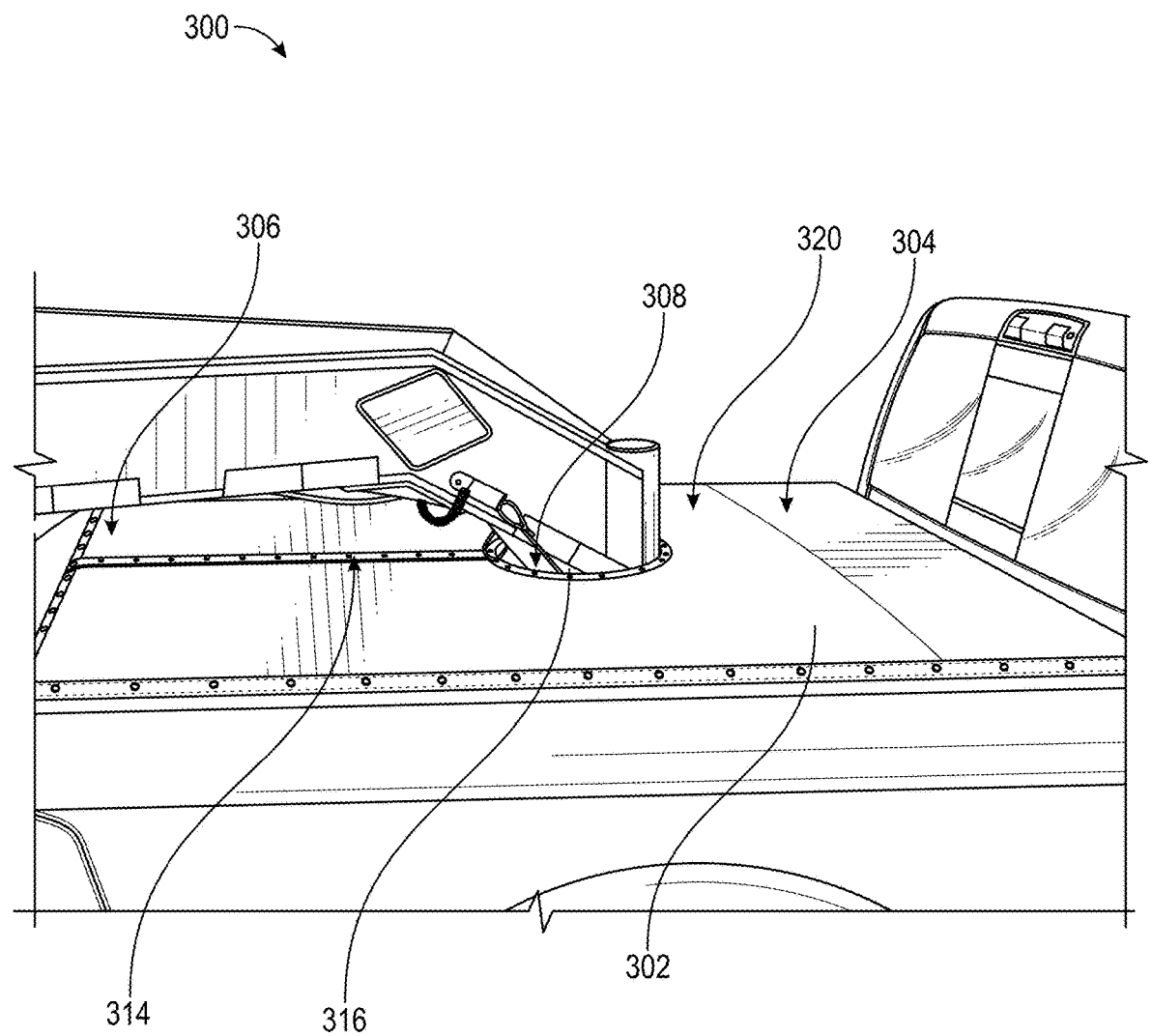
FIG. 8 illustrates a side perspective view of a tonneau cover system.

In one embodiment, as shown in FIGS. 7-8, a tonneau cover system 300 may comprise a sheet of material 302. The sheet of material 302 may cover the entire bed of a truck. The cover 300 may be manufactured from a soft, hard, or mix of soft and hard material. For example, the sheet of material 302 may be manufactured from vinyl, canvas, aluminum, fiberglass, wood, or any other type of material. In some embodiments, the sheet of material 302 may be configured to roll towards the cab of the truck to provide access to the bed of the truck. Alternatively, in some embodiments, the sheet of material 302 may comprise sealed, folding slits so as to allow the sheet 302 to be folded towards the cab of the truck to provide access to the bed of the truck. Furthermore, the cover 300 may comprise a hard material, such as fiberglass, that is coupled to the bed of the truck and lifted via hydraulic arms or other assisting mechanisms. In other embodiments, the cover 300 may comprise multiple sections that slide into the bed of the truck.

The sheet of material 302 may comprise a front portion 304, a rear or tailgate portion 306, and a hitch aperture 308 interposed thereinbetween so as to receive a pin box of a fifth wheel trailer 112 (shown in FIG. 3) or any other type of trailer coupleable to a hitch receiver (e.g., trailer hitch ball or fifth wheel receiver) in a bed of a truck. The front portion 304 may be coupled to the bed rail proximate a cab of the truck via a front fastener (e.g., hook and loop, snaps, clamps, or bolts). The tailgate portion 306 may comprise a first section 310 and a second section 312, both of which may be coupled to each other via a section fastener, such as hook and loop, snaps, or magnets. In between the first and second sections 310 and 312, a channel 314 may be created that leads to the hitch aperture 308. The hitch receiver 114 may be located under the hitch aperture 308 when the cover 300 is coupled to the truck.

Further, the cover 300 may comprise a frame positioned thereunder to add support to the cover 300. In an alternate embodiment, the cover 300 may be frameless and be supported by itself after it is coupled to the bed of the truck. It will be appreciated that the cover 300 may protect cargo from the elements and theft while also allowing a trailer to be hitched to the hitch receiver in the truck bed. The aperture 308 may, in some embodiments, be circumscribed by stretchable material that may fit tightly around the pin box that would further ensure that debris and water not enter the bed of the truck. In other embodiments, the aperture 308 may be circumscribed by a fastener 316. Alternatively, the fastener 316 may circumscribe a portion of the aperture. The fastener 316 may include snaps, hook and loop, buckles, or any other type of fastening mechanism.

To cover the aperture 308, the lid cover 318 may be removably attachable to an upper surface 320 of the cover 300. In particular, the lid cover 318 may be removably attachable to the fastener 316. As such, when a user desires to couple a pin box to the hitch receiver in the truck bed, the lid cover 318 may be removed therefrom to allow access to the truck bed. The lid cover 318 may, in some embodiments, be a flap that comprises a side that is either permanently or non-permanently attached to the sheet of material 302. The lid cover 318 may be manufactured from the same material as the cover 300 or a different material.

Figure 9:
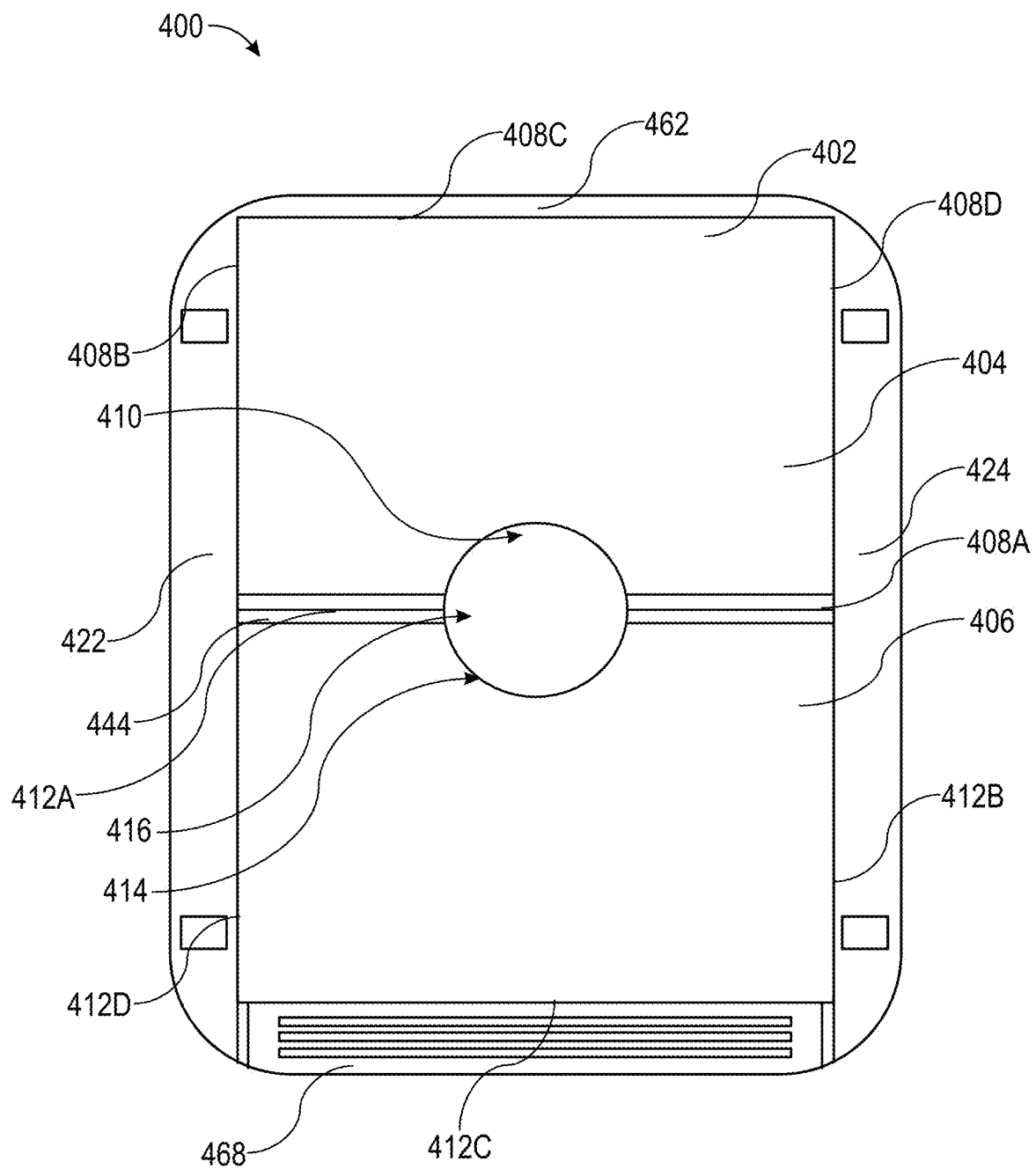
FIG. 9 illustrates a top plan view of a tonneau cover system.
Figure 10:
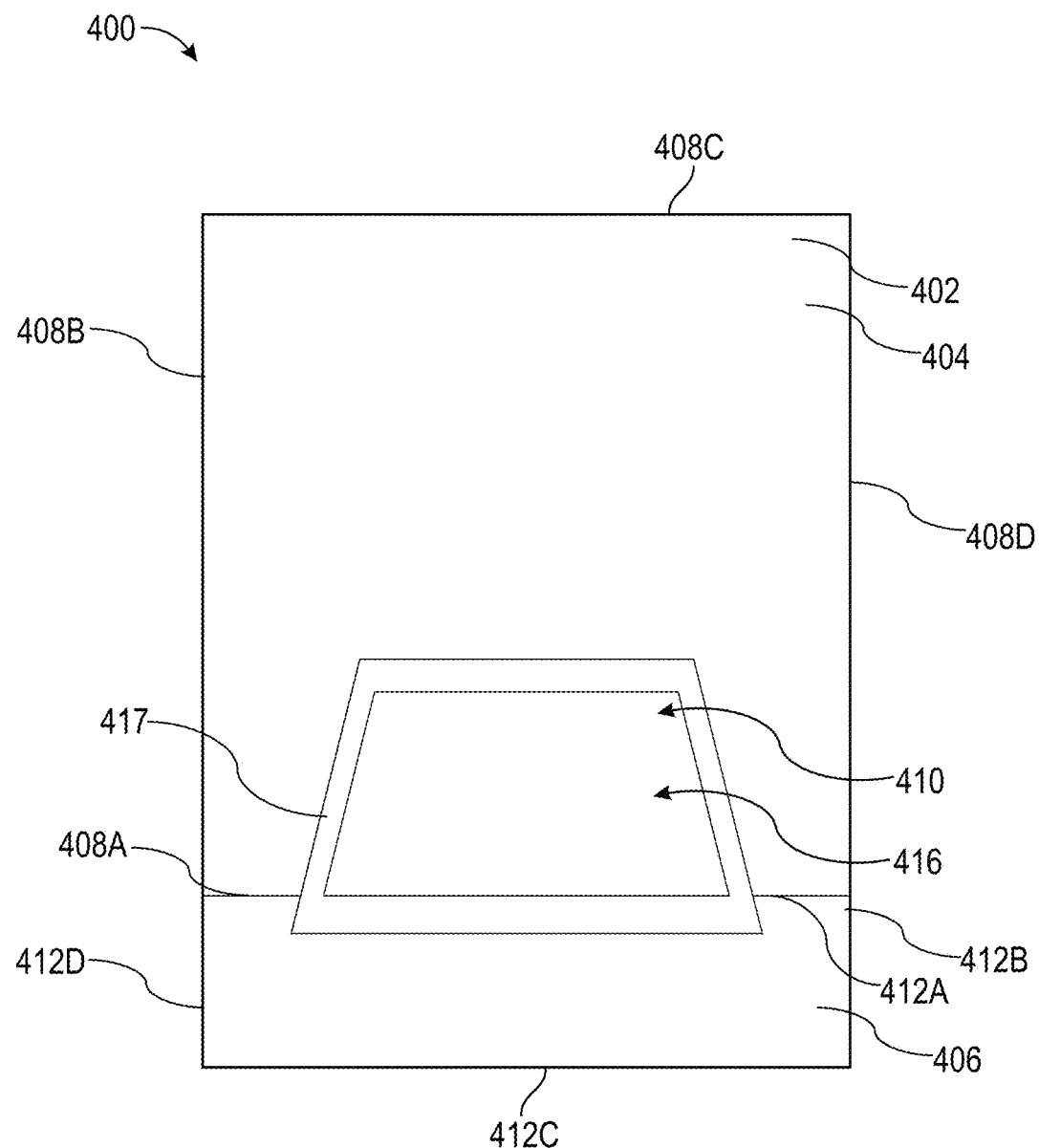
FIG. 10 illustrates a top plan view of a tonneau cover system.

In one embodiment, as shown in FIGS. 9-10, the tonneau cover system 400 may comprise a sheet of material 402. The sheet of material 402 may be manufactured out of a rigid material. The rigid material may include, but is not limited to, aluminum, steel, plastic, fiberglass, carbon fiber, or wood. In some embodiments, the sheet of material 402 may be manufactured out of a semi-rigid material (e.g., rubber), a soft material (e.g., vinyl), or a combination of rigid, semi-rigid, and soft. The sheet of material 400 may comprise a first section 404 and a second section 406. The first section 404 may comprise a first side 408A, a second side 408B, a third side 408C, and a fourth side 408D. The second and fourth sides 408B, 408D may be positioned on the sides, bedrails of the truck. The third side 408C may be positioned against a rear of the truck bed proximate a cab of the truck. The first side 408A may comprise a first recessed portion 410 to receive a pin box of a trailer.

The second section 406 may comprise a fifth side 412A, a sixth side 412B, a seventh side 412C, and an eighth side 412D. The sixth and eighth sides 412B, 412D may be positioned on the sides, bedrails of the truck. The seventh side 412C may be positioned against the tailgate of the truck. The first side 408A of the first section 404 and the fifth side 412A of the second section 406 may contact each other. The fifth side 412A may comprise a second recessed portion 414 to receive a pin box of a trailer. When the first and second sections 404, 406 contact each other, a hitch aperture 416 may be created between the first recessed portion 410 and the second recessed portion 414. In some embodiments, the hitch aperture 416 may be positioned on the first section 404 (as shown in FIG. 10) or the second section 406. It will be appreciated that the hitch aperture 416 may be of any size or shape. For example, in some embodiments, the hitch aperture 416 may be circular while in other embodiments, the hitch aperture 416 may be trapezoidal shaped. The hitch aperture 416 may change size and shape based upon the type of hitch used, such as a goose neck hitch or a fifth wheel camper trailer hitch. In some embodiments, the hitch aperture 416 may be covered by a lid 417. The lid 417 may be manufactured out of a rigid, semi-rigid, or soft material. The lid 417 may couple to a lid fastener positioned on the first and second sections 404, 406. The lid fastener may comprise hook and loop, bolts, pins, latches, or any other type of coupling mechanism. Further, it will be appreciated that the first section 404 and second section 406 may be the same length or different lengths.

Figure 11:
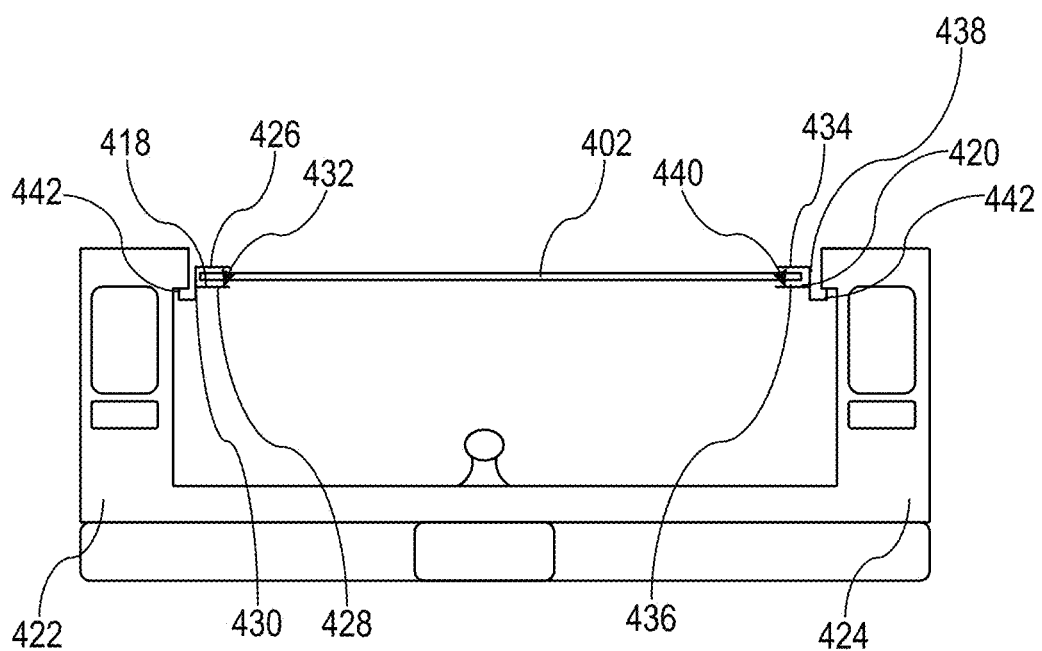
FIG. 11 illustrates a rear elevation view of a tonneau cover system in a bed of a truck.

As shown in FIG. 11, the first and second sections 404, 406 may slide into the bed of the truck via a first bracket 418 and a second bracket 420, with the first bracket 418 coupled to a first side 422 of the truck bed and the second bracket 420 coupled to a second side 424 of the truck bed. The first bracket 418 may comprise a first top wall 426, a first bottom wall 428, and a first sidewall 430 perpendicular to and coupled to the first top wall 426 and the first bottom wall 428. A first channel 432 may be positioned between the first top wall 426 and the first bottom wall 428. The first bracket 418 may run the entire length of the first side 422 of the truck bed. In other embodiments, the first bracket 418 may be in multiple, separate sections with gaps thereinbetween along the entire length of the first side 422. The second bracket 420 may comprise a second top wall 434, a second bottom wall 436, and a second sidewall 438 perpendicular to and coupled to the second top wall 434 and the second bottom wall 438. A second channel 440 may be positioned between the second top wall 434 and the second bottom wall 436. The second bracket 420 may run the entire length of the second side 424 of the truck bed. In other embodiments, the second bracket 420 may be in multiple, separate sections with gaps therein between along the entire length of the second side 424. While the first and second brackets 418, 420 are shown as C-brackets, it will be understood that the first and second brackets 418, 420 may be an L-shaped bracket or any other type of bracket or coupling mechanism may be used to receive the first and second sections 404, 406. In some embodiments, the first and second channels 432, 440 may comprise bearings or another type of assisting mechanism that helps a user slide the first and second sections 404, 406 through the first and second channels 432, 440. The first and second brackets 418, 420 may be coupled to the first side 422 and second side 424 via a first fastener 442. The first fastener 442 may include, but is not limited to, c-clamps, screws, or bolts and nuts. In some embodiments, the first and second brackets 418, 420 may be removably attachable to the bed of the truck via, for example, clamps, latches, thumb bolts, pins, or another quick-release mechanism. In other embodiments, the first and second brackets 418, 420 may be permanently coupled to the bed of the truck.

Figure 12:
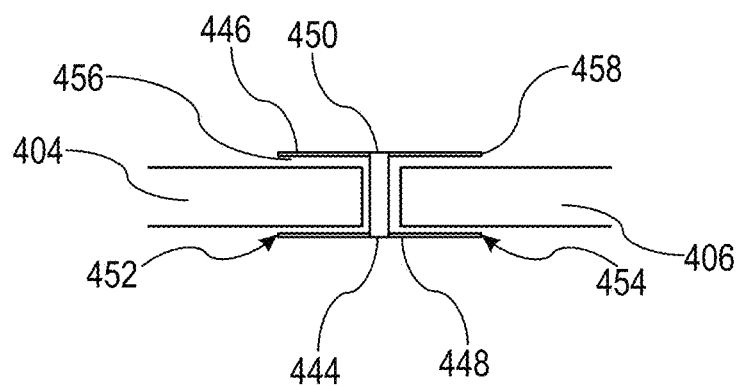
FIG. 12 illustrates a side elevation view of a third bracket of a tonneau cover system.

In addition, as shown in FIGS. 9 and 12, the first and second sections 404, 406 may be secured to each other via a third bracket 444. The third bracket 444 may be an H-shaped bracket comprising an upper wall 446, a lower wall 448, and an inner wall 450 perpendicular to and between the upper wall and lower walls 446, 448. The third bracket 444 may comprise a first section channel 452 and a second section channel 454, the second section channel 454 being opposite the first section channel 452. The first section channel 452 may be located on a first side 456 of the third bracket 444 between the upper wall 446 and lower wall 448 and receive the first side 408A of the first section 404. The second section channel 454 may be located on a second side 458 of the third bracket 444 between the upper wall 446 and lower wall 448 and receive the fifth side 412A of the second section 406. It will be appreciated that the third bracket 444 adds stability to the cover system 400. In some embodiments, a first end and a second end of the third bracket may couple to the first and second sides 422, 424 of the truck via a removably attachable fastener, which may temporarily couple the third bracket 444 to the truck bed until a user removes the removably attachable fastener. In some embodiments, the third bracket 444 may be L-shaped brackets coupled to either the first or second sections 404, 406 so as to allow the first or second sections 404, 406 to rest on the L-shaped bracket. In other embodiments, the fifth side 412A of the second section 406 may slide into a recessed channel on the first side 408A of the first section 404. Further, in other embodiments, the first section 404 and second section 406 may couple to each other via latches, hook and loop, magnets, or any other coupling mechanisms.

Figure 13:
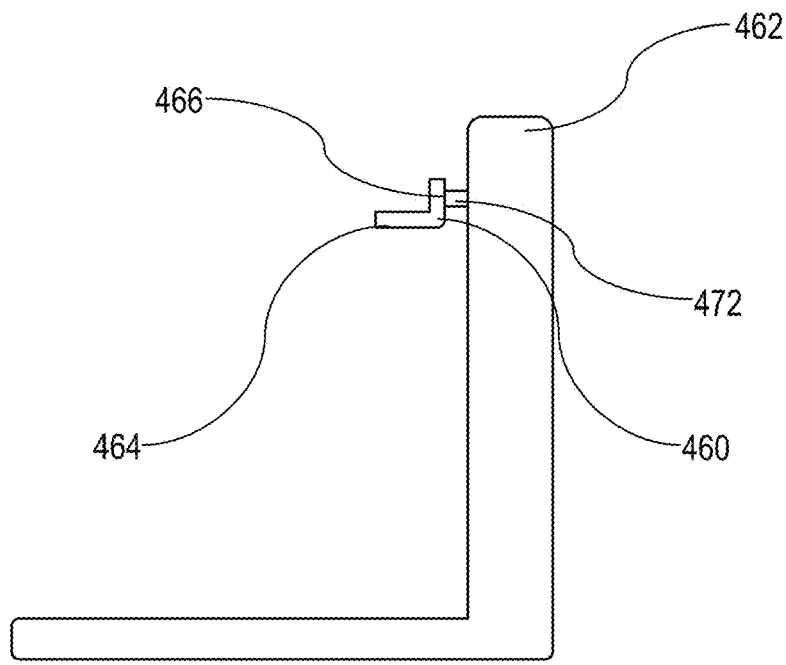
FIG. 13 illustrates a side elevation view of a truck bed with a fourth bracket coupled thereto.
Figure 14:
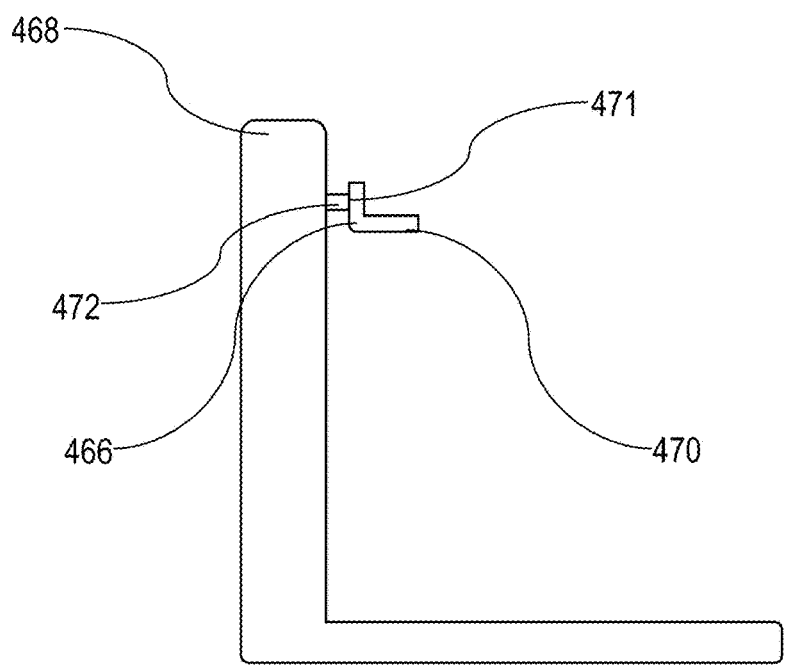
FIG. 14 illustrates a side elevation view of a truck bed with a fifth bracket coupled thereto.

Further, as shown in FIGS. 13-14, a fourth bracket 460 may be coupled to a third side 462 of the truck. That is, the fourth bracket 460 may be coupled to the rear side proximate the cab of the truck. The fourth bracket 460 may be an L-shaped bracket comprising a first ledge 464 and a first wall 466 perpendicular to and coupled to the first ledge 464. The third side 408C of the first section 404 may rest on the first ledge 464, providing additional support to the first section 404. The fourth bracket 460 may run the length of the third side 462 of the truck. In other embodiments, the fourth bracket 460 may be in section with gaps thereinbetween along the third side 462 of the truck. A fifth bracket 466 may be coupled to a fourth side 468 of the truck. That is, the fifth bracket 466 may be coupled to the tailgate of the truck. The fifth bracket 466 may be an L-shaped bracket comprising a second ledge 470 and a second wall 471 472 perpendicular to and coupled to the second ledge 470. The seventh side 412C of the second section 406 may rest on the second ledge 470, providing additional support to the second section 406. The fifth bracket 466 may run the length of the fourth side 468 of the truck. In other embodiments, the fifth bracket 466 may be in sections with gaps thereinbetween along the fourth side 468 of the truck. While the fourth and fifth brackets 460, 466 may be shown as L-shaped brackets, it will be understood that the fourth and fifth brackets 460, 466 may be C-shaped brackets or any other type of bracket. Further, the fourth and fifth brackets 460, 466 may be coupled to the bed of the truck via a second fastener 472. The second fastener 472 may comprise screws, bolts and nuts, thumb bolts, pins, or any other securement mechanism. In some embodiments, the fourth and fifth brackets 460, 466 may be removably attachable to the bed of the truck via, for example, clamps, latches, or another quick-release mechanism. In other embodiments, the fourth and fifth brackets 460, 466 may be permanently coupled to the bed of the truck.

It will be appreciated that in some embodiments, the first, second, third, fourth, and fifth brackets 418, 420, 444, 460, 466 will be level with each other, or in other words on the same plane. However, in some embodiments, the first, second, third, fourth, and fifth brackets 418, 420, 444, 460, 466 may be at different levels or angles. To use the cover 400, a user may slide the first section 404 into the first and second brackets 418, 120, pushing it until the third side 408C of the first section 404 contacts the third side 462 of the truck bed and rests upon the fourth bracket 460. The user may then slide the second section 406 into the first and second brackets 418, 420 until it contacts the first section 404. In particular, the user may slide the first section 404 until it contacts the third bracket 444 positioned between the first section 404 and second section 406, thereby securing the first section 404 to the second section 406. The seventh side 412C of the second section 406 may rest upon the fourth bracket 466 once the tailgate of the truck is closed. With the first and second sections 404, 406 in place, a user may position a pin box of a trailer through the hitch aperture 416. Accordingly, a trailer may be coupled to the truck while a user may also cover items in the bed of the truck.

The cover system 100, 200, 300, 400 described herein keeps cargo protected from debris, water, and theft, while still allowing a fifth wheel camper trailer to be attached to the truck. Having a cover that can receive a fifth wheel pin box, allows a user to utilize the storage in the bed of the truck while protecting the cargo therein. Not only is extra, covered storage produced by using the cover system 100, 200, 300, 400 but the cover system 100, 200, 300, 400 leads to a more aerodynamic truck, thereby saving the user on fuel expenses.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A tonneau cover system comprising:
   a first bracket removably attachable to a first side of a truck bed;
   a second bracket removably attachable to a second side of the truck bed;
   a third bracket with a first channel and a second channel;
   a sheet of material comprising:
      a first section comprising:
         a first side, a second side, a third side, a fourth side;
      a second section comprising:
         a fifth side, a sixth side, a seventh side, and an eighth side;
      wherein when the first side of the first section and the fifth side of the second section contact each other, a hitch aperture is formed.

2. The tonneau cover system of claim 1, wherein the sheet of material comprises a rigid material.

3. The tonneau cover system of claim 1, wherein the sheet of material comprises a semi-rigid material.

4. The tonneau cover system of claim 1, wherein the sheet of material comprises a soft material.

5. The tonneau cover system of claim 1, wherein the sheet of material comprises a combination of rigid and semi-rigid material.

6. The tonneau cover system of claim 1, wherein the third bracket comprises an upper wall, a lower wall, and an inner wall perpendicular to and between the upper and lower walls.

7. The tonneau cover system of claim 1, wherein the first and second channels receive the first section and second section.

8. The tonneau cover system of claim 1, further comprising a fourth bracket coupled to a third side of the truck that receives the third side of the first section.

9. The tonneau cover system of claim 1, further comprising a fifth bracket coupled to a fourth side of the truck that receives the seventh side of the second section.

10. The tonneau cover system of claim 1, wherein the first side of the first section comprises a first recessed portion and the fifth side of the second section comprises a second recessed portion that when together form the hitch aperture.

11. The tonneau cover system of claim 1, further comprising a lid that shields the hitch aperture.

12. A tonneau cover system comprising:
    a first bracket removably attachable to a first side of a truck bed;
    a second bracket removably attachable to a second side of the truck bed;
    a sheet of material comprising:
       a first section comprising:
          a first side having a first recessed portion, a second side, a third side, a fourth side;
       a second section comprising:
          a fifth side comprising a second recessed portion, a sixth side, a seventh side, and an eighth side;
    a third bracket with a first channel and a second channel that releasably couples the first section to the second section;
    wherein when the first side of the first section and the fifth side of the second section contact each other, the first recessed portion and second recessed portion form a hitch aperture.

13. The tonneau cover system of claim 12, further comprising a first fastener that couples the first bracket and the second bracket to the truck bed.

14. The tonneau cover system of claim 12, further comprising a fourth bracket that couples to a third side of the truck bed.

15. The tonneau cover system of claim 12, further comprising a fifth bracket that couples to a fourth side of the truck bed.

16. A tonneau cover system comprising:
    a sheet of material comprising:
       a front portion coupleable to the bed rail proximate the cab of the truck via a first fastener;
       a rear, tailgate portion comprising:
          a first section and a second section, the first section and the second section coupleable to each other via a section fastener, wherein when the first and second sections are decoupled, a channel leads to a hitch aperture; and
          the hitch aperture interposed between the front portion and the rear portion, the hitch aperture, on an upper surface thereof, being circumscribed by a second fastener;
    a lid to cover the hitch aperture, the lid removably attachable to the second fastener; and
    a frame that adds support to the sheet of material, the frame comprising one or more support bars that are removably attachable to a lower surface of the sheet of material.

* * * * *